(12) United States Patent
Lin et al.

(10) Patent No.: US 11,348,349 B2
(45) Date of Patent: May 31, 2022

(54) TRAINING DATA INCREMENT METHOD, ELECTRONIC APPARATUS AND COMPUTER-READABLE MEDIUM

(71) Applicant: Wistron Corporation, New Taipei (TW)

(72) Inventors: Zhe-Yu Lin, New Taipei (TW); Chih-Yi Chien, New Taipei (TW); Kuan-I Chung, New Taipei (TW)

(73) Assignee: Wistron Corporation, New Taipei (TW)

( * ) Notice: Subject to any disclaimer, the term of this patent is extended or adjusted under 35 U.S.C. 154(b) by 64 days.

(21) Appl. No.: 16/995,817

(22) Filed: Aug. 18, 2020

(65) Prior Publication Data

US 2021/0390282 A1 Dec. 16, 2021

(30) Foreign Application Priority Data

Jun. 16, 2020 (TW) .................................. 109120137

(51) Int. Cl.
*G06V 20/64* (2022.01)
*G06K 9/62* (2022.01)
*G06T 7/00* (2017.01)

(52) U.S. Cl.
CPC .......... *G06V 20/64* (2022.01); *G06K 9/6256* (2013.01); *G06T 7/97* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2018/0330511 | A1* | 11/2018 | Ha ....................... G06K 9/6247 |
| 2018/0373999 | A1 | 12/2018 | Xu |
| 2019/0102654 | A1 | 4/2019 | Trehan |
| 2019/0286987 | A1 | 9/2019 | Lie et al. |
| 2021/0118113 | A1* | 4/2021 | Li ........................... G06T 7/001 |

FOREIGN PATENT DOCUMENTS

| CN | 108538390 | 9/2018 |
| CN | 110070935 | 7/2019 |

OTHER PUBLICATIONS

"Office Action of Taiwan Counterpart Application", dated Jan. 6, 2021, p. 1-p. 12.
"Office Action of India Counterpart Application", dated Dec. 30, 2021, with English translation thereof, pp. 1-6.

* cited by examiner

*Primary Examiner* — Leon Flores
(74) *Attorney, Agent, or Firm* — JCIPRNET

(57) ABSTRACT

A training data increment method, an electronic apparatus and a computer-readable medium are provided. The training data increment method is adapted for the electronic apparatus and includes the following steps. A training data set is obtained, wherein the training data set includes a first image and a second image. An incremental image is generated based on the first image and the second image. A deep learning model is trained based on the incremental image.

20 Claims, 9 Drawing Sheets

TRAINING DATA INCREMENT METHOD, ELECTRONIC APPARATUS AND COMPUTER-READABLE MEDIUM

CROSS-REFERENCE TO RELATED APPLICATION

This application claims the priority benefit of Taiwan application serial no. 109120137, filed on Jun. 16, 2020. The entirety of the above-mentioned patent application is hereby incorporated by reference herein and made a part of this specification.

BACKGROUND OF THE DISCLOSURE

1. Field of the Disclosure

The disclosure relates to an object detection technology, and in particular to a training data increment method, an electronic apparatus and a computer-readable medium for object detection.

2. Description of Related Art

In recent years, operation devices is getting more and more refined, resulting in the prevalence of neural networks of deep learning that require a large amount of operation. The neural network of deep learning learns through massive data, thus making a great breakthrough in the accuracy in image recognition, natural language and other fields. Particularly, the image recognition technology of deep learning is also integrated into production lines industrially to identify the yield rate of the output objects, thereby improving the yield rate of the produced products.

However, the neural network of deep learning needs to learn through massive marked data, and the marked data usually needs to be marked manually, causing the consumption of time and manpower. Moreover, the imbalance of the amount of data in different training categories also affects the prediction accuracy of deep learning. Therefore, in practice, the neural network of deep learning cannot be easily applied directly. For example, if you want to apply deep learning image recognition to the defect detection of product elements, while samples with defects are very few and the coverage is insufficient, it may make the defect detection accuracy insufficient to reach the stage of use. Therefore, how to increase appropriate training data is a topic concerned by those skilled in the art.

SUMMARY OF THE DISCLOSURE

In view of this, the disclosure provides a training data increment method, an electronic apparatus and a computer-readable medium, which can increase the amount of data for training a deep learning model to improve the object defect detection accuracy.

An embodiment of the disclosure provides a training data increment method, adapted to an electronic apparatus. The method includes the following steps. A training data set is obtained, where the training data set includes a first image and a second image. An incremental image is generated based on the first image and the second image. A deep learning model is trained based on the incremental image.

An embodiment of the disclosure provides an electronic apparatus, including a storage apparatus and a processor. The processor is coupled to the storage apparatus and is configured to execute instructions in the storage apparatus to perform the following steps. A training data set is obtained, where the training data set includes a first image and a second image. An incremental image is generated based on the first image and the second image. A deep learning model is trained based on the incremental image.

An embodiment of the disclosure provides a non-transitory computer-readable medium, recording programs and loaded in the electronic apparatus to perform the following steps. A training data set is obtained, where the training data set includes a first image and a second image. An incremental image is generated based on the first image and the second image. A deep learning model is trained based on the incremental image.

Based on the above, in the embodiments of the disclosure, the incremental image is generated based on a vector relationship between the first image and the second image. By training the deep learning model using the incremental image, the object defect detection accuracy of the deep learning model can be improved.

In order to make the above features and advantages of the disclosure comprehensible, the disclosure is described in detail below through embodiments with reference to the accompanying drawings.

DESCRIPTION OF THE EMBODIMENTS

Figure 1:
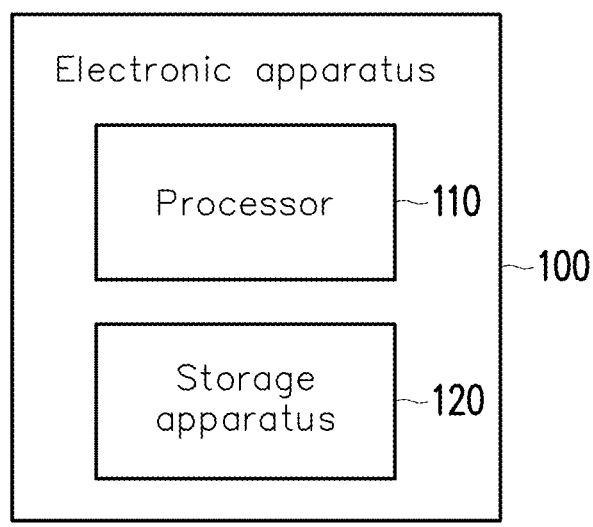
FIG. 1 is a block diagram of an electronic apparatus according to an embodiment of the disclosure.

Some embodiments of the disclosure are described in detail below with reference to the accompanying drawings. Reference numerals referenced in the following description are regarded as identical or similar elements when identical reference numerals appear in different drawings. The embodiments are only a part of the disclosure, and do not disclose all implementable manners of the disclosure. More exactly, the embodiments are only examples of the method and the system in the scope of the claims of the disclosure.

FIG. 1 is a block diagram of an electronic apparatus according to an embodiment of the disclosure. However, it is only for convenience of description and is not intended to limit the disclosure. With reference to FIG. 1, an electronic apparatus 100 includes a processor 110 and a storage apparatus 120. The electronic apparatus 100 may be coupled to an image capturing apparatus (not shown), receive an image taken by the image capturing apparatus, and store the taken image into the storage apparatus 120. The image capturing apparatus is configured to capture images from a space, and includes a camera lens with a lens and a photosensitive element. The photosensitive element is configured to sense an intensity of light entering the lens to generate an image. The photosensitive element may be, for example, a charge coupled device (CCD), a complementary metal-oxide semiconductor (CMOS) element, or other elements. In an embodiment, the image capturing apparatus is configured to capture images of an element to be detected to generate a training data set.

The electronic apparatus 100 is, for example, a notebook computer, a desktop computer, a server apparatus, or other computer apparatuses with computing ability, and the disclosure is not limited thereto. The electronic apparatus 100 may receive a plurality of images from the image capturing apparatus via a data transmission interface. In an embodiment, the electronic apparatus 100 may be configured to perform image processing on the image captured by the image capturing apparatus, and detect defects in the image through the deep learning model.

The processor 110 is coupled to the storage apparatus 120, such as a central processing unit (CPU), or other programmable general-purpose or special-purpose microprocessors, a digital signal processor (DSP), a programmable controller, an application specific integrated circuit (ASIC), a programmable logic device (PLD), a graphics processing unit (GPU) or other similar apparatuses or a combination of these apparatuses. The processor 110 may execute program codes, software modules, instructions and the like recorded in the storage apparatus 120.

The storage apparatus 120 is configured to store data such as images, codes, and software elements. It may be, for example, any type of fixed or removable random access memory (RAM), a read-only memory (ROM), a flash memory, a hard disk or other similar apparatuses, an integrated circuit, and a combination thereof.

Figure 2:
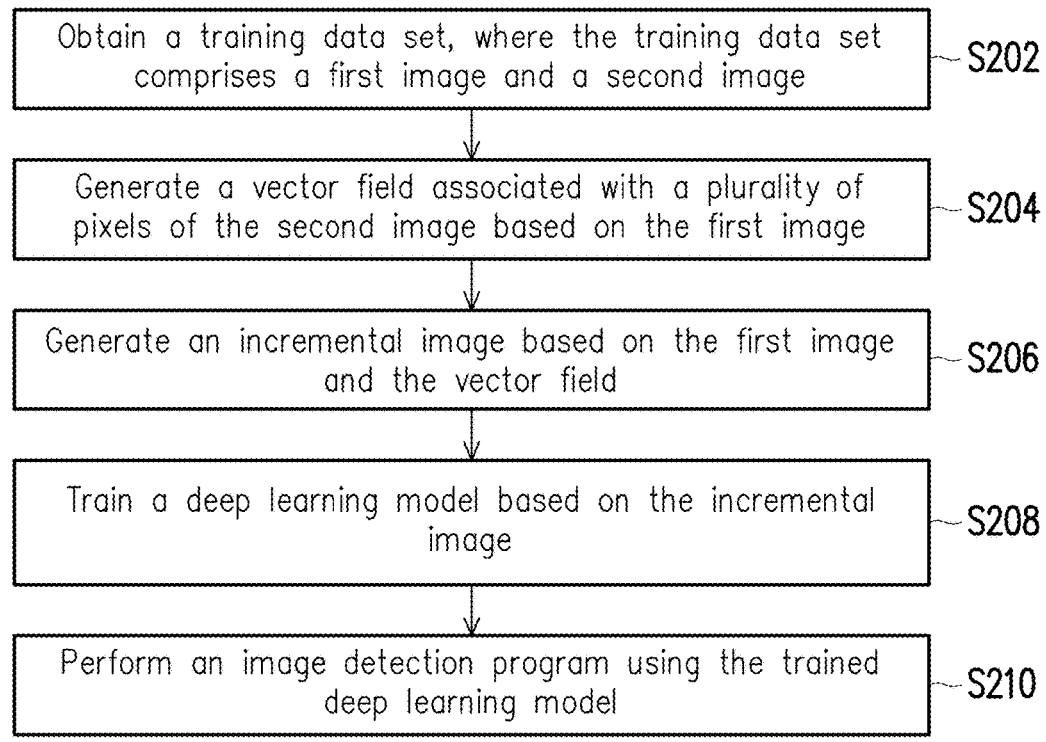
FIG. 2 is a flowchart of a training data increment method according to an embodiment of the disclosure.

FIG. 2 is a flowchart of a training data increment method according to an embodiment of the disclosure. With reference to FIG. 2, the method according to the embodiment is adapted to the electronic apparatus 100 in FIG. 1. The detailed flow of the method according to the embodiment is described below in conjunction with various elements in the electronic apparatus 100.

First, at step S202, the processor 110 obtains a training data set, and the training data set includes a plurality of images. In an embodiment, the training data set includes at least a first image and a second image. Specifically, the processor 110 obtains a plurality of original training images in the training data set, and labels image categories of the original training images. In other words, these original training images have been assigned solution categories. For example, there may be two image categories, namely a defective image and a non-defective image, but the disclosure is not limited thereto.

In an embodiment, the first image and the second image may be two original training images among the plurality of images generated by the image capturing device. Alternatively, in another embodiment, the first image and the second image may be generated after the processor 110 performs image processing on two original training images among the plurality of images. Here, image categories of the first image and the second image are the same as that of the original training image before processing. The image processing above may be an operation such as image cutting, rotation, noise reduction processing, saturation adjustment, or brightness adjustment. In the embodiment, the processor 110 may capture the first image and the second image from the original training images based on a region of interest (ROI). By setting the region of interest, an image block (i.e., the first image or the second image) that needs to be focused on in the original training image can be circled, and this image block can be used for subsequent processing to generate a new image block.

At step S204, the processor 110 generates a vector field associated with a plurality of pixels of the second image based on the first image. At step S206, the processor 110 generates an incremental image based on the first image and the vector field. Specifically, the processor 110 inputs the first image and the second image into an image increment model, and generates an incremental image. Here, the image increment model includes two parts, namely an image coding model and spatial transform. At the same time, the processor 110 determines an image category of the generated incremental image based on image categories of a moving image and a fixed image. In an embodiment, if the image category of one of the moving image and the fixed image is a defective image, the processor 110 labels the image category of the generated incremental image as a defective image. In other words, if the image categories of the moving image and the fixed image are both non-defective images, the processor 110 labels the image category of the generated incremental image as a non-defective image.

In detail, in step S204 of generating the vector field, the processor 110 establishes a pixel-to-pixel corresponding relationship between a group of first images and second images using the image coding model. The processor 110 sets the first image and the second image as the moving image and the fixed image, respectively. For convenience of description, it is assumed here that the first image is the moving image and the second image is the fixed image. Here, the processor 110 inputs the moving image and the fixed image into the image increment model, and minimizes an objective function of the vector field to generate a registration field ($\psi$) corresponding to the moving image and the fixed image. $\psi$ is a vector field, and the vector field is associated with a pixel-to-pixel displacement vector between the moving image and the fixed image. In a domain of the vector field, each point in the space has a set of two-dimensional vectors. If this vector field is described as a function, all parts in the vector field are continuous and differentiable. In other words, if one point is placed anywhere in the vector field, the point will move along the vector field.

Therefore, in step S206, the processor 110 may perform a spatial transform operation using the generated registration field and the moving image to generate an incremental image. Specifically, the processor 110 may determine a moving position of each pixel in the moving image using the registration field to generate the incremental image. In an embodiment, the processor may perform the spatial transform operation using the following Formula (1):

$$m \circ \emptyset(p) = \Sigma_{q \in z(p')} m(q) \Pi_{d \in (x,y)} 1 - |p'_d - q_d| \qquad (1)$$

where p is each pixel in m. p'=p+u(p), where u(p) is spatial gradient displacement of p. z(p') represents all neighboring pixels of p'. q is one of the neighboring pixels of p'. m(q) is a q pixel in the image m. d is spatial dimension {x, y}.

In addition, in an embodiment, the objective function minimized by the processor 110 when the image increment model is trained is, for example, smoothness of the vector field w and a similarity between the moving image and the fixed image. Through the objective function, it can be ensured that the generated registration field is smooth and continuous to confirm the deformation occurring in practice. The processor 110, for example, may set the following Formula (2) as a loss function:

$$\mathcal{L}_{us}(f,m,\emptyset)=\mathcal{L}_{sim}(F,m\circ\emptyset)+\lambda\mathcal{L}_{smooth}(\emptyset) \quad (2)$$

where λ is a regularization parameter. $\mathcal{L}_{sim}(f, m\circ\emptyset)$ is a loss function of the similarity between the moving image and the fixed image. In an embodiment, for example, the following Formula (3) can be used for derivation:

$$L_{sim}(f, m\circ\emptyset) = \frac{\left(\sum_{p_i}(f(p_i) - \hat{f}(p))([m\circ\emptyset](p_i) - [\hat{m}\circ\emptyset](p)))\right)^2}{\left(\sum_{p_i}(f(p_i) - \hat{f}(p))^2\right)\left(\sum_{p_i}([m\circ\emptyset](p_i) - [\hat{m}\circ\emptyset](p))^2\right)} \quad (3)$$

where $\mathcal{L}_{smooth}(\emptyset)$ is a loss function of the smoothness of the vector field ψ. In an embodiment, for example, the following Formula (4) can be used for derivation:

$$\mathcal{L}_{smooth}(\emptyset)=\Sigma_{p\in\Omega}\|\nabla u(p)\|^2 \quad (4)$$

where $$\nabla u(p) = \left(\frac{\partial u(p)}{\partial x}, \frac{\partial u(p)}{\partial y}\right),$$

u(p) is spatial gradient displacement of p.

In an embodiment, the image coding model may be implemented using a Unet model or other similar models in a convolutional neural network (CNN) architecture.

At step S208, the processor 110 trains the deep learning model based on the incremental image. Specifically, the processor 110 builds the deep learning model in advance and stores the deep learning model in the storage apparatus 120. The processor 110 may train the deep learning model based on the images included in the training data set and/or the incremental image generated according to the foregoing steps and the image categories corresponding to these images. In addition, the processor 110 stores model parameters of the trained deep learning model (such as the number of neural network layers and the weight of each neural network layer) in the storage apparatus 120. In an embodiment, the deep learning model is, for example, a VGG model used for classification among the convolution neural network (CNN) models, ResNet, DenseNet and the like.

At step S210, the processor 110 performs an image detection program using the trained deep learning model. Specifically, when performing the image detection program, the processor 110 may receive an image and input the image to the trained deep learning model. The trained deep learning model first performs feature capture on the image to generate a feature vector. Each dimension in this feature vector is used to represent a certain feature in the image. Then, these feature vectors will be input to a classifier in the trained deep learning model, and the classifier will classify according to these feature vectors, and then identify whether the images belong to the image category of defective images or non-defective images.

Figure 3:
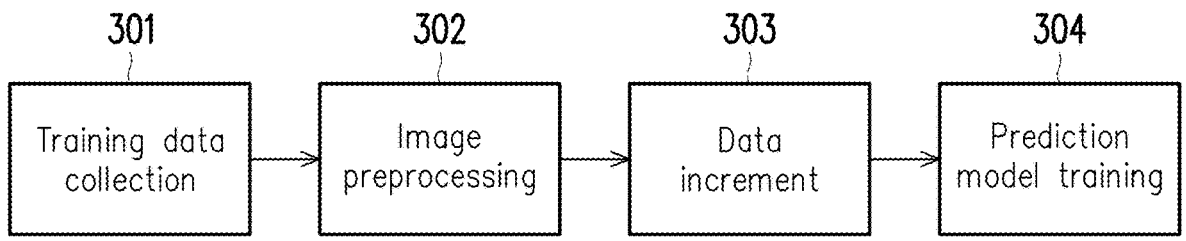
FIG. 3 is a flowchart of generating a prediction model according to an embodiment of the disclosure.

FIG. 3 is a flowchart of generating a prediction model according to an embodiment of the disclosure. The neural network of deep learning needs to learn through massive data. However, in the actual operation of production lines or other fields, the image samples with defects are fewer and the coverage is insufficient. Moreover, the imbalance of the amount of data in different image categories also affects the prediction accuracy of the trained deep learning model. Based on this, with reference to FIG. 3, the steps in an embodiment include, but are not limited to, training data collection 301, image preprocessing 302, data increment 303 and prediction model training 304. By the data increment 303 method provided by the disclosure, these embodiments add an augmented incremental image to the prediction model, which can improve the prediction accuracy of the prediction model.

The specific implementation content of the training data increment method provided by the disclosure will be described in detail below with different embodiments, respectively.

Figure 4:
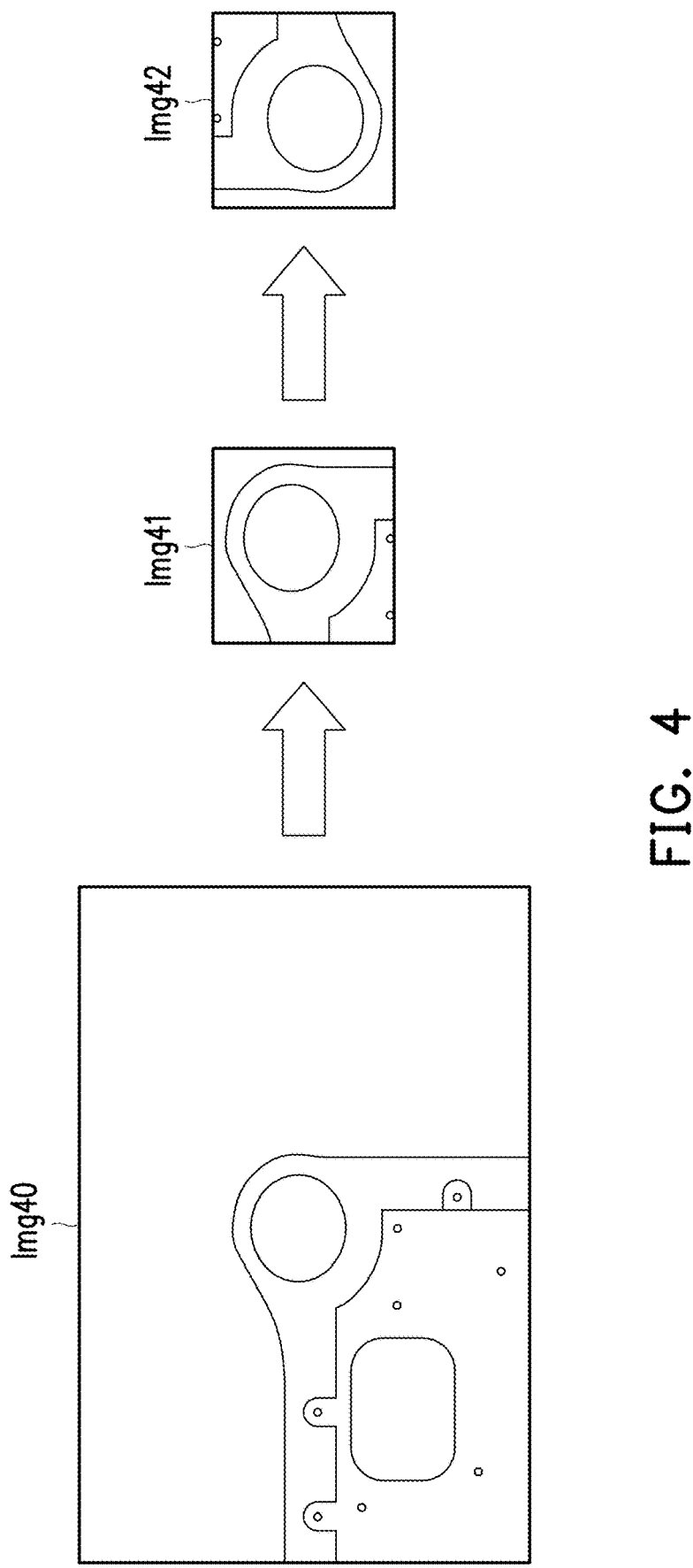
FIG. 4 is a schematic diagram of image preprocessing according to an embodiment of the disclosure.

In an embodiment, the description is made by detecting whether a Stinifer hole in the middle of the image is defective, for example, is damaged or dirty. FIG. 4 is a schematic diagram of image preprocessing according to an embodiment of the disclosure. In FIG. 4, first, the processor 110 obtains a training data set. The training data set includes a plurality of original training images labeled as the defective images and the non-defective images, respectively. The processor 110 then performs image preprocessing on the plurality of original training images to obtain a plurality of processed images. With an original training image Img40 in the training data set as an example, the processor 110 detects a target object in the original training image Img40 using circle detection and circles a bounding box of the detected target object. Next, the processor 110 cuts the original training image Img40 based on the bounding box to generate a processed image Img41. In an embodiment, the processor 110 detects the target object in the original training image Img40, using, for example, HoughCircles. In an embodiment, the processor 110 may take the center of the coordinate of the target object as the center and capture the image of the region of interest from specific image length and width around the target object to generate a bounding box.

Angles of the Stinifer holes (i.e., the target object) included in the original training images of the training data set are not necessarily the same. Therefore, in another embodiment, the processor 110 may also determine the angle of each processed image based on image intensity values of an image edge of the processed image (i.e., the cut image), and rotate each processed image based on the angles to the same angle. With reference to FIG. 4, a lower edge and a left edge of the processed image Img41 are two edges along which the Stinifer holes extend, so the image intensity values of the lower edge and the left edge are higher than those of an upper edge and a right edge. Here, the angle of the processed image Img41 can be determined based on the image intensity value of the edge of the image. In an embodiment, the processor 110 rotates the processed image Img41 based on the image intensity value of the processed image Img41 to generate a processed image Img42.

Figure 5:
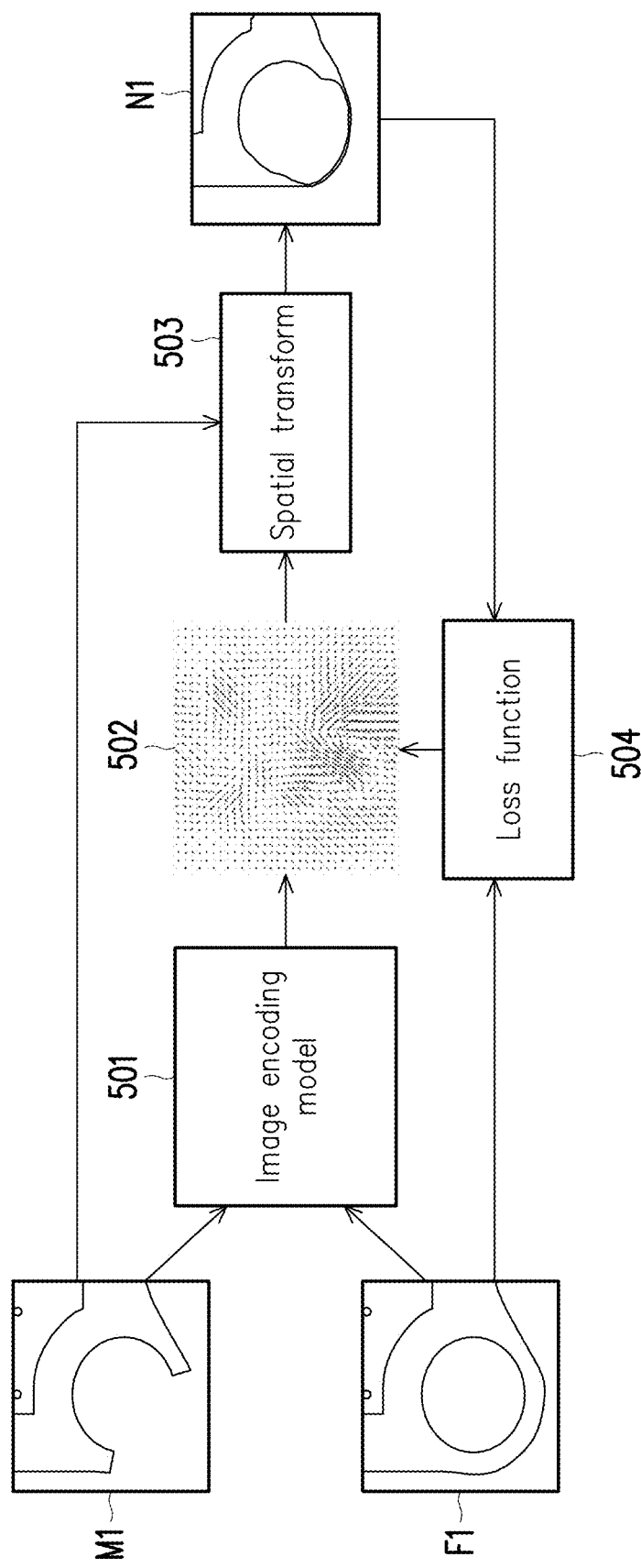
FIG. 5 is a flowchart of a training data increment method according to an embodiment of the disclosure.

FIG. 5 is a flowchart of a training data increment method according to an embodiment of the disclosure. After performing image preprocessing on the images included in the training data set, a plurality of processed images may be generated. The processor 110 selects any two processed images from the plurality of processed images for data increment. With reference to FIG. 5, the processor 110 sets the first image as a moving image M1 and sets the second image as a fixed image F1. The image category of the first image is a defective image and the image category of the second image is a non-defective image. The processor 110 inputs the moving image M1 and the fixed image F1 into the image increment model and generates an incremental image N1. The image increment model includes an image encoding model 501, spatial transform 503, and a loss function 504. In detail, the processor 110 inputs the moving image M1 and the fixed image F1 to the image encoding model 501, and generates a registration field 502. Next, the processor 110 generates the incremental image N1 using the spatial transform 503 based on the moving image M1 and the registration field 502. The loss function 504 may be set as the objective function when training the image increment model. In an embodiment, since the image category of the moving image M1 is a defective image, the processor 110 labels the image category of the generated incremental image N1 as a defective image.

Figure 6:
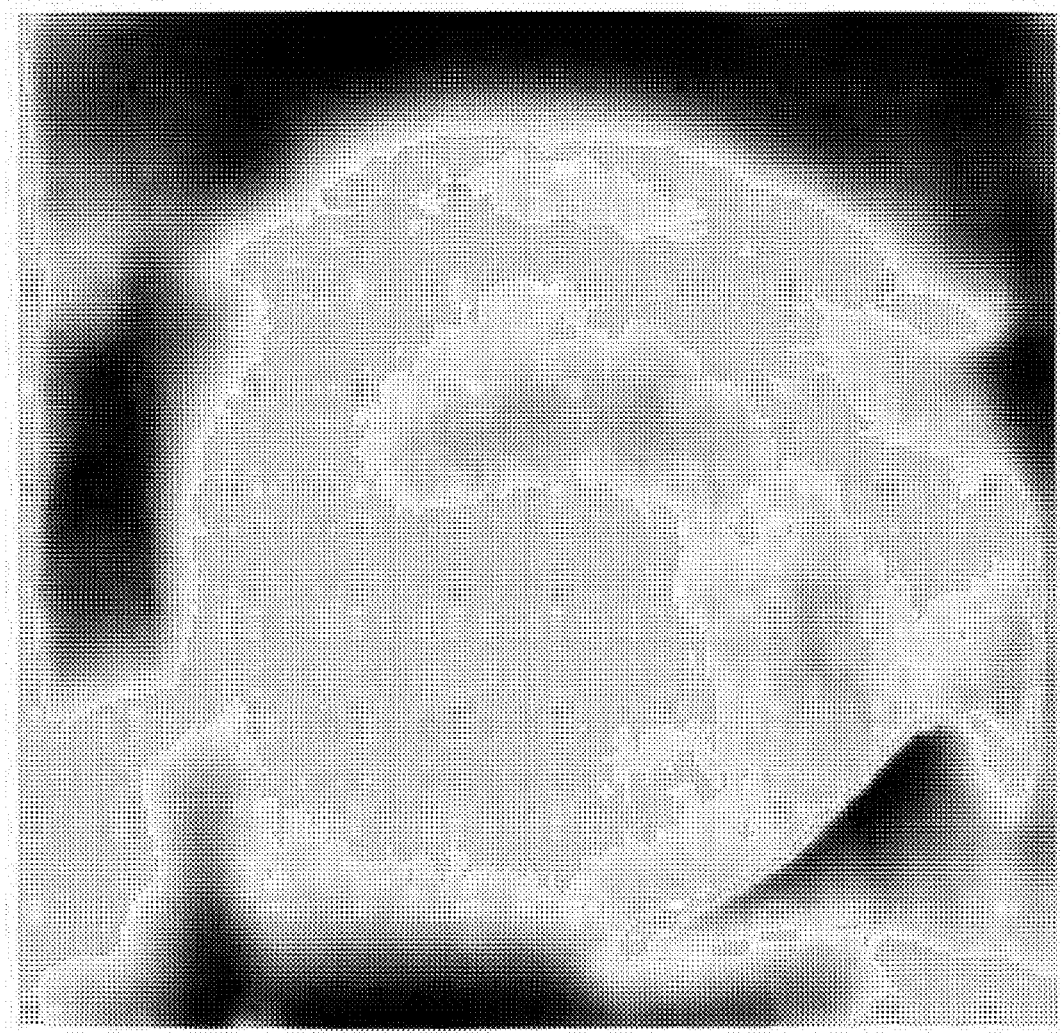
FIG. 6 is a schematic diagram of a registration field according to an embodiment of the disclosure.

FIG. 6 is a schematic diagram of a registration field according to an embodiment of the disclosure. For the registration field corresponding to the moving image M1 and the fixed image F1, reference may be made to FIG. 6.

After a plurality of incremental images including the incremental image N1 are trained, the processor 110 inputs the processed images in the training data set (e.g., the processed image Img41, the processed image Img42, the moving image M1, and/or the fixed Image F1) and the incremental image to the deep learning model and trains the deep learning model. After the deep learning model is trained, the processor 110 may execute a Stinifer hole defect detection program using the trained deep learning model.

Figure 7:
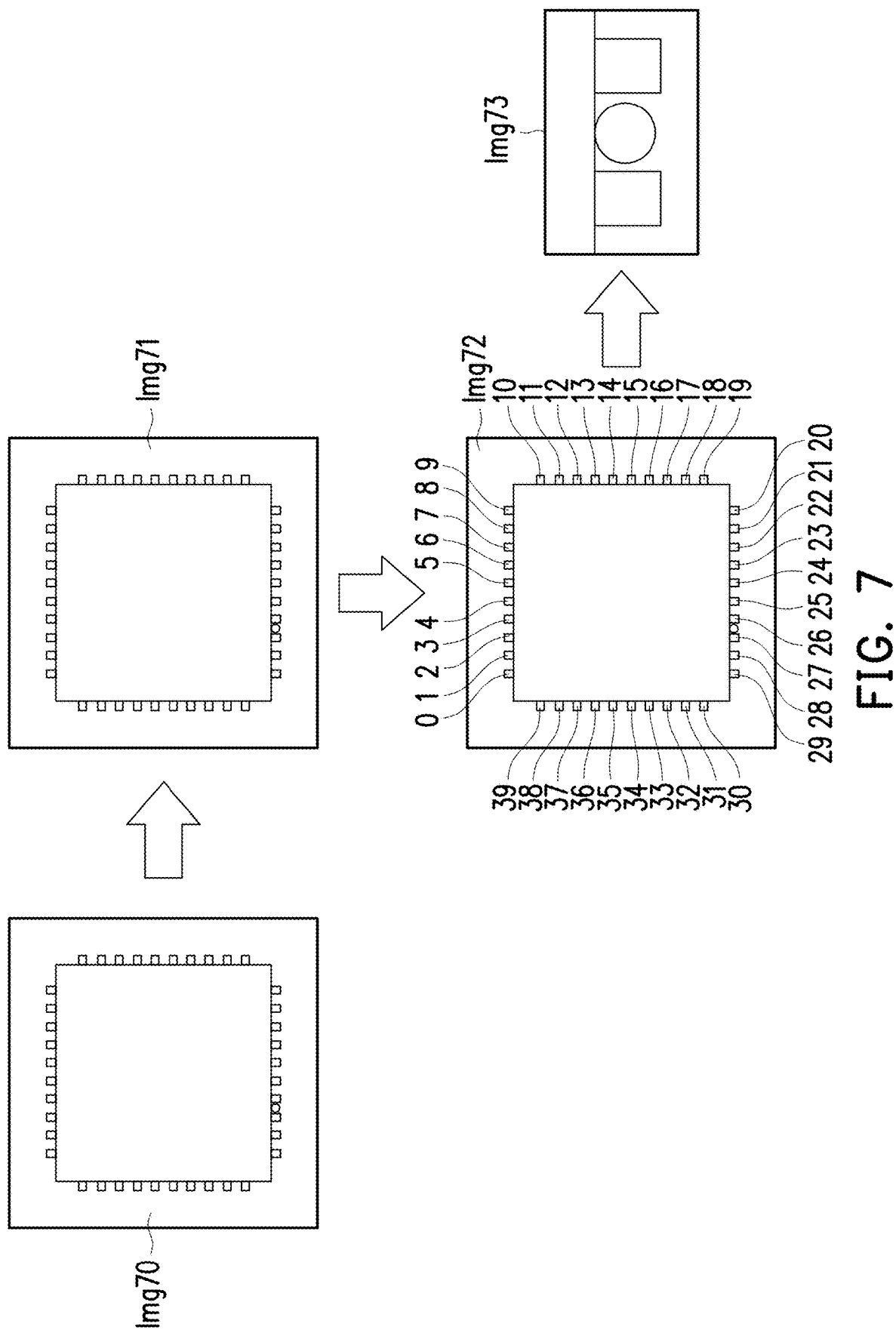
FIG. 7 is a schematic diagram of image preprocessing according to an embodiment of the disclosure.

In an embodiment, detecting the continuous tin electrodeposit problem of an electronic panel is described. FIG. 7 is a schematic diagram of image preprocessing according to an embodiment of the disclosure. In FIG. 7, first, the processor 110 obtains a training data set. The training data set includes a plurality of original training images labeled as the defective images and the non-defective images, respectively. The processor 110 then performs image preprocessing on the original training image. Since the continuous tin electrodeposit problem occurs between pins of the electronic panel, during image preprocessing, the processor 110 detects the target object in the original training image using image recognition and sets an object number corresponding to the target object. With an original training image Img70 in the training data set as an example, the processor 110 detects pins in the original training image Img70 using image recognition and sets pin numbers corresponding to the pins. The image Img72 shows the recognized pins and pin numbers 0 to 39 corresponding to the pins. In other embodiments, the processor 110 may first convert the original training image Img70 into a grayscale image Img71, then recognize pins in the grayscale image Img71, and perform a subsequent cutting step.

Next, the processor 110 cuts the original training image Img70 based on the pin number to generate a processed image Img73 (i.e., cut image). In an embodiment, the processor 110 uses a pin 26 and a pin 27 as a group to capture the processed image Img73 from the original training image Img70. In an embodiment, the processor 110 takes, for example, the center of the coordinates of two pins as the center, captures the image of the region of interest from specific image length and width around the pin to generate a bounding box, and captures the processed image Img73 from the original training image Img70 based on the bounding box. In an embodiment, the processor 110 may determine the angle of each processed image based on a length and a width of the cut image, and rotate each processed image to the same angle based on the angles. In an embodiment, the processor 110 determines whether the processed image includes continuous tin electrodeposit defects using image recognition. If the processed image includes continuous tin electrodeposit defects, the processor 110 labels the image category of the processed image as a defective image. If the cut image does not include the continuous tin electrodeposit defects, the processor 110 labels the image category of the processed image as a non-defective image.

Figure 8:
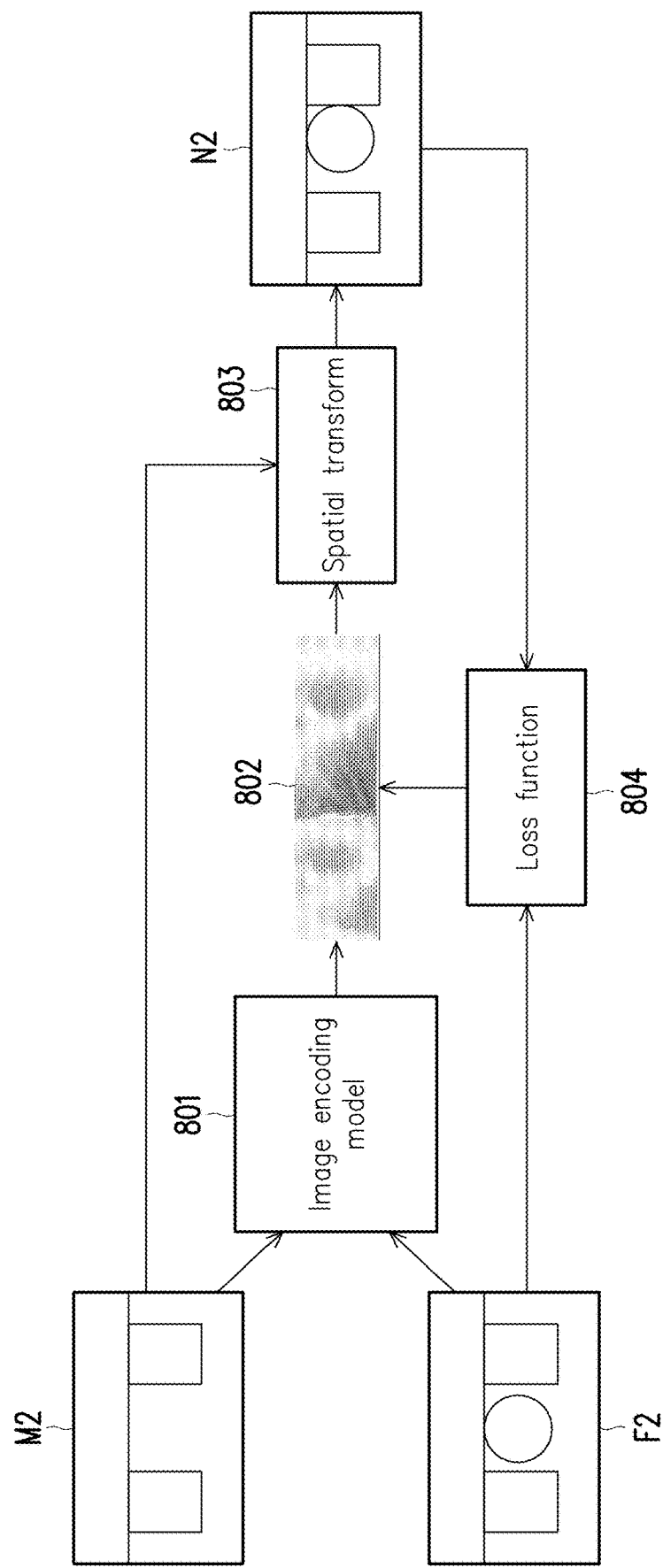
FIG. 8 is a flowchart of a training data increment method according to an embodiment of the disclosure.

FIG. 8 is a flowchart of a training data increment method according to an embodiment of the disclosure. After performing image preprocessing on the images included in the training data set, a plurality of processed images may be generated. The processor 110 selects any two images from the plurality of processed images for data increment. With reference to FIG. 8, the processor 110 sets the first image as a moving image M2, and sets the second image as a fixed image F2. The image category of the first image is a non-defective image, and the image category of the second image is a defective image. The processor 110 inputs the moving image M2 and the fixed image F2 into the image increment model and generates an incremental image N2. The image increment model includes an image encoding model 801, spatial transform 803, and a loss function 804. In detail, the processor 110 inputs the moving image M2 and the fixed image F2 to the image encoding model 801, and generates a registration field 802. Next, the processor 110 generates an incremental image N2 using the spatial transform 803 based on the moving image M2 and the registration field 802. The loss function 804 may be set as the objective function when training the image increment model. In an embodiment, since the image category of the fixed image F2 is a defective image, the processor 110 labels the image category of the generated incremental image N2 as a defective image.

Figure 9:
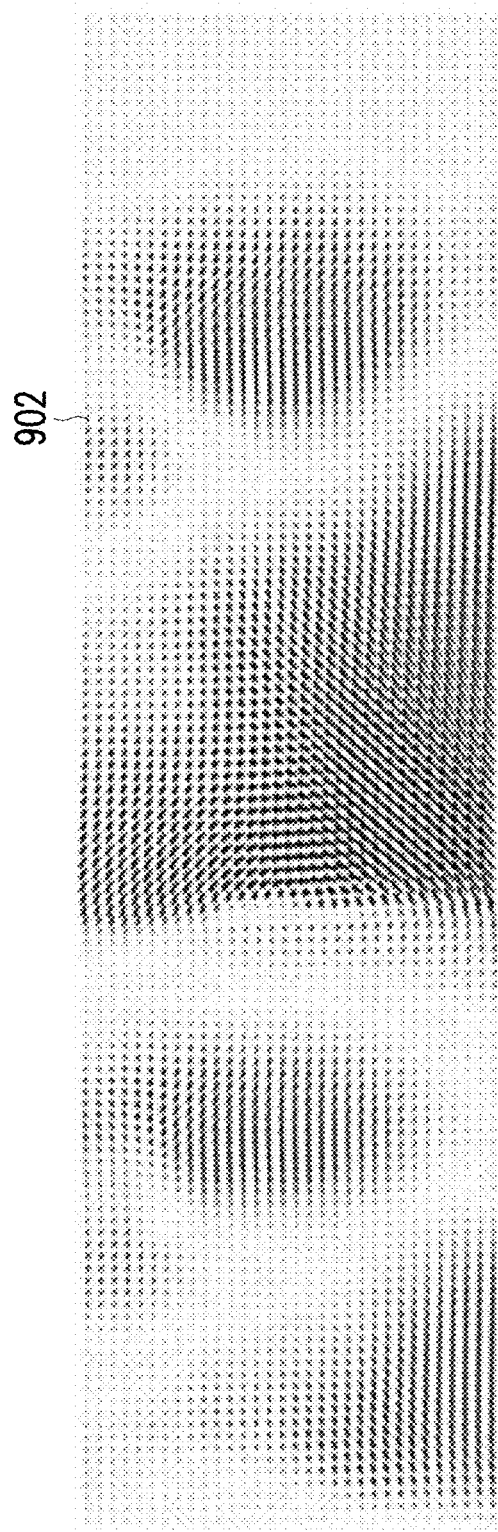
FIG. 9 is a schematic diagram of a registration field according to an embodiment of the disclosure.

FIG. 9 is a schematic diagram of a registration field according to an embodiment of the disclosure. For a practical example of the registration field corresponding to the moving image M2 and the fixed image F2, reference may be made to the registration field 902 in FIG. 9.

Figure 10:
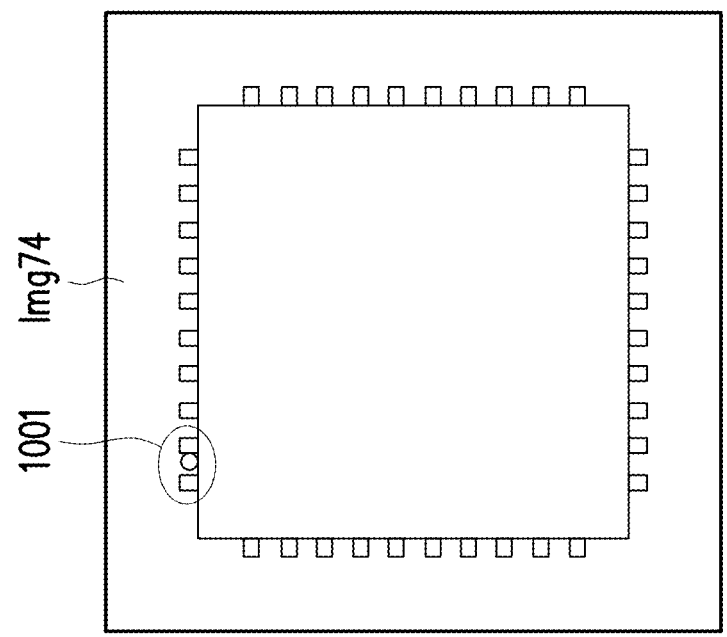
FIG. 10 is a schematic diagram of generating a training image according to an embodiment of the disclosure.
Figure 10:
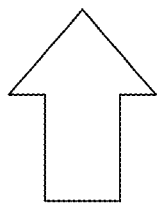
Figure 10:
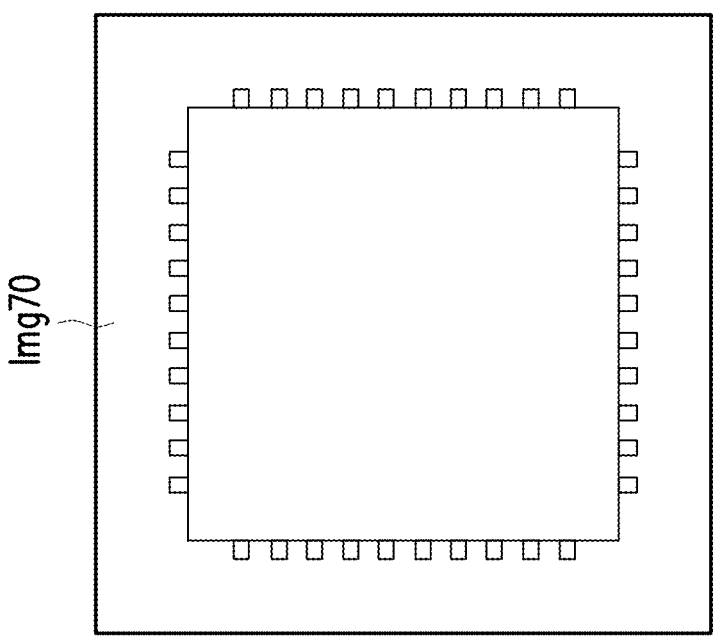

FIG. 10 is a schematic diagram of generating a training image according to an embodiment of the disclosure. In this example, after a plurality of incremental images including an incremental image N2 is trained, the processor 110 generates a training image based on the incremental image and the original training image. With reference to FIG. 10, the processor 110 overlays the generated incremental image back to the original training image Img70 (or the grayscale image Img71) at pin positions of any two pins (as indicated by a box 1001) to generate a training Image Img74. In addition, the processor 110 labels the image category of the training image based on the image category of the incremental image. If at least one of the image category of the incremental image for overlaying or the image category of the overlaid grayscale image is a defective image, the processor 110 labels the generated training image as a defective image. In this way, the training data increment method provided by an embodiment can realize that there is no change in other positions with the exception of the continuous tin electrodeposit appearing on the pin positions in the image. Accordingly, the problem of image distortion during data increment can be reduced, and it can control at will to allow the continuous tin electrodeposit to appear on any pin.

Finally, the processor 110 inputs the original training image and the training image (e.g., the training image Img74) in the training data set to the deep learning model, and trains the deep learning model. After the deep learning model is trained, the processor 110 may perform the continuous tin electrodeposit defect detection program using the trained deep learning model.

This application also provides a non-transitory computer-readable medium, in which a computer program is recorded. The computer program is used to execute various steps of the training data increment method above. This computer program consists of a plurality of code fragments (such as organization chart creation code fragments, signing form code fragments, setting code fragments, and deploying code fragments), and the steps of the training data increment method above can be completed after these code fragments are loaded into the electronic apparatus.

Based on the above, the training data increment method, the electronic apparatus, and the computer-readable medium provided by the disclosure can use a small number of images in the training data set to generate a plurality of incremental images. In this way, the amount of training data for training the deep learning model can be increased to improve the object defect detection accuracy.

Although the disclosure is described above with embodiments, the embodiments are not intended to limit the disclosure. Any person of ordinary skill in the art may make variations and modifications without departing from the spirit and scope of the disclosure. The protection scope of the disclosure should be subject to the appended claims.

What is claimed is:

1. A training data increment method, adapted for an electronic apparatus, the method comprising: obtaining a training data set, wherein the training data set comprises a first image and a second image; generating an incremental image based on the first image and the second image generating a vector field associated with a plurality of pixels of the second image based on the first image; generating an incremental image based on the first image and the vector field; and training a deep learning model based on the incremental image.

2. The training data increment method according to claim 1, wherein the step of generating the vector field associated with the plurality of pixels of the second image based on the first image comprises:
minimizing an objective function of the vector field to generate a registration field corresponding to the first image and the second image.

3. The training data increment method according to claim 2, wherein the step of generating the incremental image based on the first image and the vector field comprises:
performing a spatial transform operation on the first image using the registration field to generate the incremental image.

4. The training data increment method according to claim 2, wherein the objective function is a similarity between the first image and the second image and smoothness of the vector field.

5. The training data increment method according to claim 1, wherein the method further comprises:
determining an image category of the incremental image based on image categories of the first image and the second image, wherein the image category comprises a defective image and a non-defective image.

6. The training data increment method according to claim 1, wherein before the step of generating the vector field associated with the plurality of pixels of the second image based on the first image, the method further comprises:
performing image preprocessing on a plurality of original training images comprised in the training data set to obtain a plurality of processed images, wherein the plurality of processed images comprise the first image and the second image.

7. The training data increment method according to claim 6, wherein the step of performing the image preprocessing on the plurality of original training images comprised in the training data set to obtain the plurality of processed images comprises:
detecting target objects in the plurality of original training images using circle detection, and circling bounding boxes of the detected target objects; and
cutting the plurality of original training images based on the bounding boxes, and generating the plurality of processed images.

8. The training data increment method according to claim 7, wherein the step of cutting the plurality of original training images based on the bounding boxes and generating the plurality of processed images comprises:
cutting the plurality of original training images based on the bounding boxes, and generating a plurality of cut images;
determining an angle of each of the plurality of cut images based on image intensity values of image edges of the plurality of cut images; and
rotating each of the plurality of cut images based on the angle of each of the plurality of cut images, and generating the plurality of processed images.

9. The training data increment method according to claim 7, wherein the step of training the deep learning model based on the incremental image comprises:
inputting the plurality of processed images and the incremental image to the deep learning model and training the deep learning model.

10. The training data increment method according to claim 6, wherein the step of performing the image preprocessing on the plurality of original training images comprised in the training data set to obtain the plurality of processed images comprises:
detecting target objects in the plurality of original training images using image recognition and setting object numbers of the target objects; and
cutting the plurality of original training images based on the object numbers, and generating the plurality of processed images.

11. The training data increment method according to claim 10, wherein the step of training the deep learning model based on the incremental image further comprises:
generating a training image based on the incremental image and the plurality of original training images; and
inputting the plurality of original training images and the training image to the deep learning model and training the deep learning model.

12. The training data increment method according to claim 11, wherein the step of generating the training image based on the incremental image and the plurality of original training images comprises:
overlaying the incremental image to the plurality of original training images and generating the training image.

13. The training data increment method according to claim 11, wherein the method further comprises:
determining an image category of the training image based on an image category of the incremental image.

14. The training data increment method according to claim 1, wherein after the step of training the deep learning model based on the incremental image, the method further comprises:

performing an image detection program using the trained deep learning model.

15. An electronic apparatus, comprising: a storage apparatus; and a processor, coupled to the storage apparatus, and configured to execute instructions in the storage apparatus to: obtain a training data set, wherein the training data set comprises a first image and a second image; generate an incremental image based on the first image and the second image generate a vector field associated with a plurality of pixels of the second image based on the first image; generate an incremental image based on the first image and the vector field; and train a deep learning model based on the incremental image.

16. The electronic apparatus according to claim 15, wherein the processor is configured to minimize an objective function of a vector field to generate a registration field corresponding to the first image and the second image.

17. The electronic apparatus according to claim 16, wherein the processor is configured to perform a spatial transform operation on the first image using the registration field to generate the incremental image.

18. The electronic apparatus according to claim 16, wherein the objective function is a similarity between the first image and the second image and smoothness of the vector field.

19. The electronic apparatus according to claim 15, wherein the processor is further configured to perform image preprocessing on a plurality of original training images comprised in the training data set to obtain a plurality of processed images, wherein the plurality of processed images comprise the first image and the second image.

20. A non-transitory computer-readable medium, recording programs, and loaded in an electronic apparatus to perform the following steps: obtaining a training data set, wherein the training data set comprises a first image and a second image; generating an incremental image based on the first image and the second image generate a vector field associated with a plurality of pixels of the second image based on the first image; generate an incremental image based on the first image and the vector field; and training a deep learning model based on the incremental image.

* * * * *